United States Patent [19]
Wudu

[11] Patent Number: 5,942,279
[45] Date of Patent: Aug. 24, 1999

[54] METHOD OF TEXTURING A LANDING ZONE

[75] Inventor: Mulugeta Zerfu Wudu, San Jose, Calif.

[73] Assignee: Western Digital Corporation, Irvine, Calif.

[21] Appl. No.: 08/832,024

[22] Filed: Apr. 2, 1997

[51] Int. Cl.$^6$ ...................................................... B05D 5/12
[52] U.S. Cl. .......................... 427/127; 427/128; 427/309
[58] Field of Search .................................... 427/127–132, 427/309

[56] References Cited

U.S. PATENT DOCUMENTS

| 5,108,781 | 4/1992 | Ranjan et al. | 427/53.1 |
| 5,235,733 | 8/1993 | Willbanks et al. | 28/105 |
| 5,508,077 | 4/1996 | Chen et al. | 428/64.3 |

OTHER PUBLICATIONS

"Safe Landings: Laser Texturing of High–Density Magnetic Disks," by Peter Baumgart, Douglas Krajnovich, Thao Nguyen, and Andrew C. Tam, IBM Corp., Data Storage Technology & Manufacture of Stoage Devices, Mar. 1996, pp. 21–27/.

"A New Texture Paradigm–Laser Zone Texture For Low Glide and Low Stiction Media", by Kuo, Gui, Marchon, Ranch & Vierk, IDEMA Insight, Jul./Aug. 1996, vol. IV, No. 4, pp. 1, 916, 22.

Primary Examiner—Bernard Pianalto
Attorney, Agent, or Firm—Leo J. Young; W. Chris Kim; Milad Shara

[57] ABSTRACT

A method and apparatus for texturing a landing zone on a substrate of a magnetic disk to reduce stiction between a magnetic transducer head and the disk is provided. The method includes projecting discrete pressurized fluid droplets to impact a substrate surface of the substrate with sufficient momentum to form cavities in a selected annular area of the substrate surface, the selected annular area with cavities therein being of sufficient width to provide a textured landing zone for the magnetic transducer head. A magnetic disk for storing data readable by a transducer head is also provided. The disk includes a rigid substrate. A textured landing zone is provided on the disk for engaging the transducer head. The textured landing zone is formed by the steps of directing a stream of discrete pressurized fluid droplets against the substrate to create roughness therein and moving the substrate and stream of droplets relative to one another in order to create an annular area of roughness. An underlayer is deposited over the substrate with the underlayer substantially replicating a surface topography of the substrate. A magnetic layer is deposited over the underlayer with the magnetic layer substantially replicating a surface topography of the underlayer and a cover layer is deposited over the magnetic layer with the cover layer substantially replicating a surface topography of the magnetic layer.

12 Claims, 5 Drawing Sheets

METHOD OF TEXTURING A LANDING ZONE

BACKGROUND OF THE INVENTION

1. Field of the Invention

In general, this invention relates to the field of magnetic hard disk drives, and more particularly, it relates to a substrate of a magnetic disk containing a hydrozone textured landing zone for contact with transducer heads and a method and apparatus for texturing a landing zone on the substrate of the magnetic disk.

2. Description of the Prior Art and Related Information

A great amount of development and effort in the field of magnetic hard disk drives has been directed to increasing the recording density of magnetic hard disk drives.

While a great number of factors are involved in achieving high recording density, one important characteristic is the need to maintain minimal tolerance between the transducer head and the recording surface, this tolerance being known as the "flying height."

In order to enable a low flying height, a very smooth planar surface is required on both the magnetic surface and the transducer head in order to provide an air "bearing" therebetween as the disk is rotated.

However, when the disks are not rotated, the transducer heads contact the recording surface and the precision planar surfaces of the disk and the head give rise to excessive stiction during start-up and stopping of the disk. This stiction during start-up and stopping of the disk causes wear between the transducer head and the recording surface which may eventually lead to malfunction of the disk drive.

To avoid, or significantly reduce, stiction between the transducer head and the disk, surfaces of magnetic disks heretofore have been intentionally roughened in selected areas to provide a landing zone for the transducer head.

Heretofore, in order to create a rough surface topography where the roughness allows lesser contact area between the transducer head and the disk, both mechanical abrasive techniques and laser techniques have been used.

In order to provide a mechanical abrasive texture in a contact start/stop (CSS) zone or landing zone on a substrate of a disk for the transducer head, the substrate may be rotated while a suitable grit, such as silicone carbide, is applied. The roughness so produced includes peaks which are jagged with sharp edges.

A disadvantage of mechanical texturing is the difficulty of accurate placement of the textured landing zone. Mechanically abrasive formed texture usually has transitions between the CSS zone and the recording data zone which arise from substrate or abrasive oscillation during texturing. These transition zones are undesirable in that they remove a substantial portion of a disk surface from being used as a recording area while at the same time do not provide useful start and stop operations for the transducer head.

As hereinabove noted, lasers have also been used for providing a surface topography for the CSS zone. A disadvantage of this method is when landing the head or slider, the head will intercept the rims thereby deforming them. Eventually, this deformation of the rims will increase the contact area between the head and the rims which increases stiction.

SUMMARY OF THE INVENTION

This invention can be regarded as a method of texturing a landing zone on a substrate of a magnetic disk for use in a disk drive having a transducer head. The method includes the step of projecting discrete pressurized fluid droplets to impact a substrate surface of the substrate with sufficient momentum to form cavities in the landing zone of sufficient width to reduce stiction between the disk and the head.

This invention can also be regarded as a method of texturing a landing zone on a substrate of a magnetic disk for use in a disk drive having a transducer head which includes the steps of forming a stream of discrete pressurized fluid droplets and directing the stream against a substrate to create roughness in the substrate. Also, the method includes the step of moving the substrate and stream of pressurized fluid droplets relative to one another in order to create an annular area of roughness in the landing zone to reduce stiction between the disk and the transducer head.

This invention can also be regarded as a magnetic disk for storing data readable by a transducer head. The disk includes a rigid substrate, and a textured landing zone. The landing zone engages the transducer head and is formed on the substrate by the steps of directing a stream of discrete pressurized fluid droplets against the substrate to create roughness therein and moving the substrate and stream of droplets relative to one another to create an annular area of roughness. The disk also includes an underlayer and a magnetic layer. The underlayer is deposited over the substrate where it substantially replicates a surface topography of the substrate and textured landing zone. The magnetic layer is deposited over the underlayer where it substantially replicates a surface topography of the underlayer and textured landing zone. Also, the textured landing zone includes a plurality of spaced apart substantially rimless depressions formed in the substrate, each such rimless depression surrounded by a substantially flat area.

This invention can also be regarded as an apparatus for texturing a landing zone on a substrate of a magnetic disk to reduce stiction between the disk and a transducer head in a magnetic disk drive. The apparatus includes a means for supporting the substrate, means for forming a steam of discrete pressurized fluid droplets, and a means for directing the stream of droplets to impact a surface of the substrate with sufficient momentum to form cavities in a selected annular area. It also includes a means for moving the substrate and stream of droplets relative to one another to create the selected annular area of cavities in the surface of the substrate thereby forming a textured landing zone.

DETAILED DESCRIPTION OF THE PREFERRD EMBODIMENTS

Figure 1:
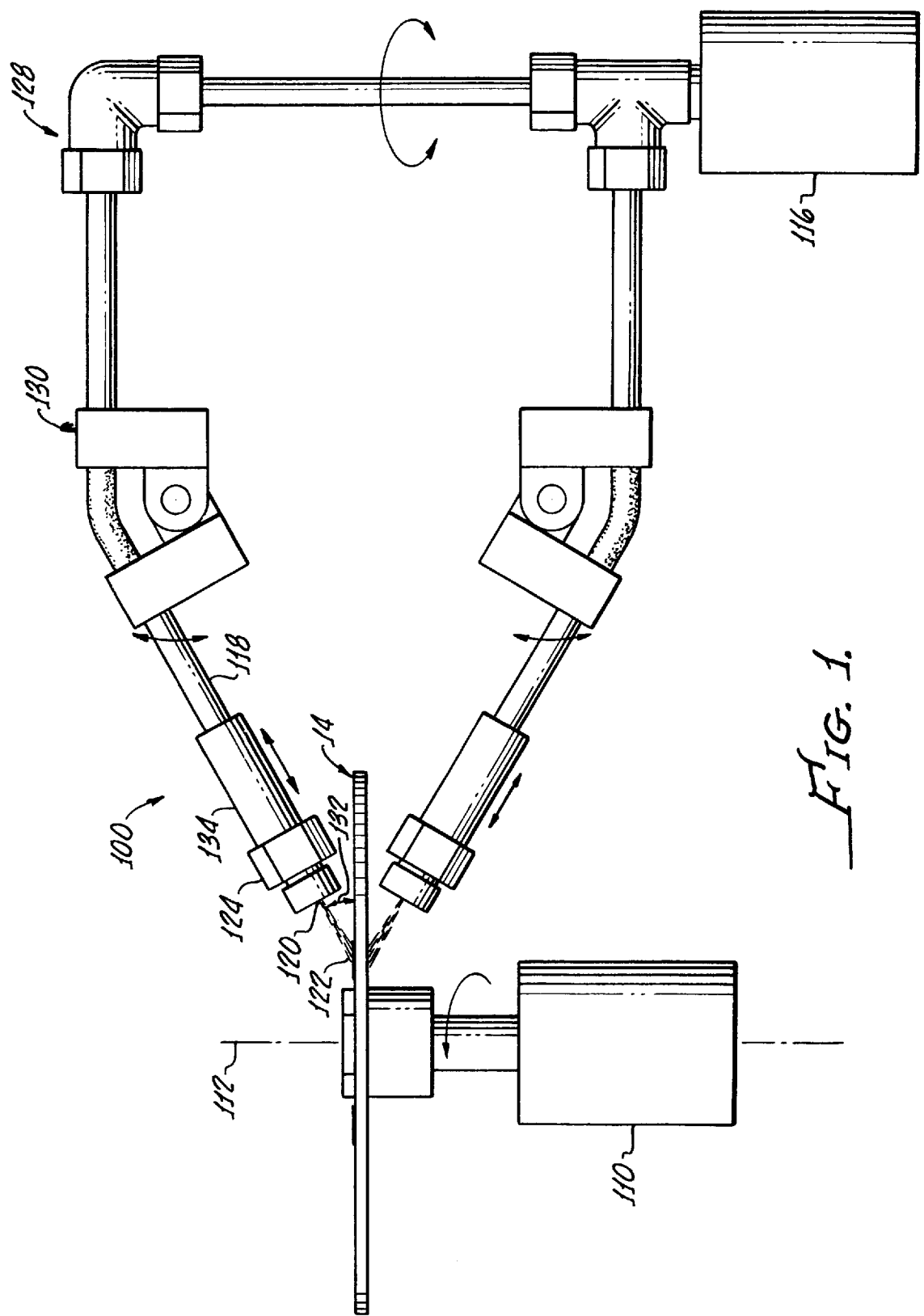
FIG. 1 is a diagram of apparatus in accordance with this invention for texturing a landing zone on a substrate.
Figure 2A:
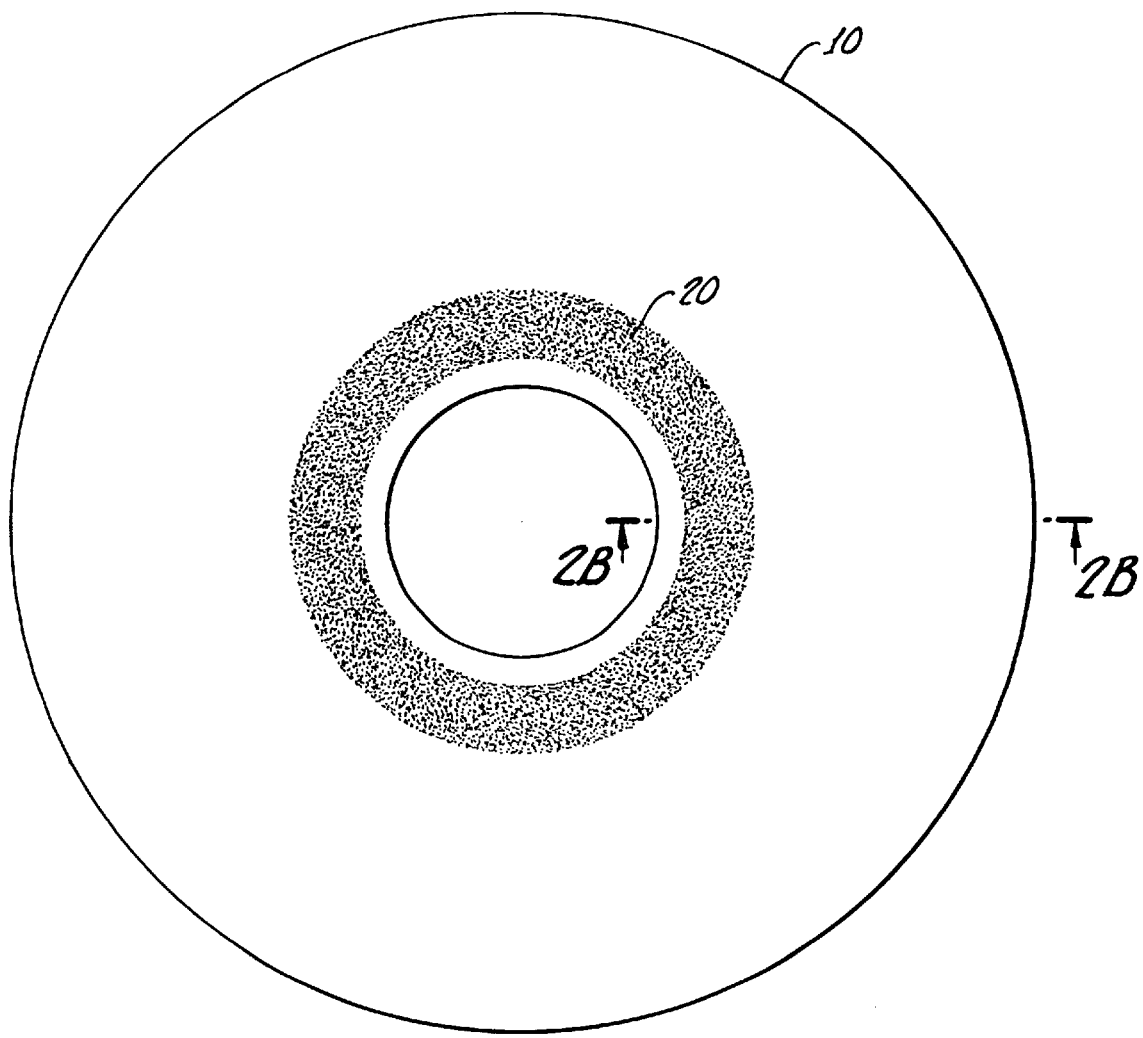
FIG. 2A shows a magnetic disk with a textured landing zone of this invention.
Figure 2B:
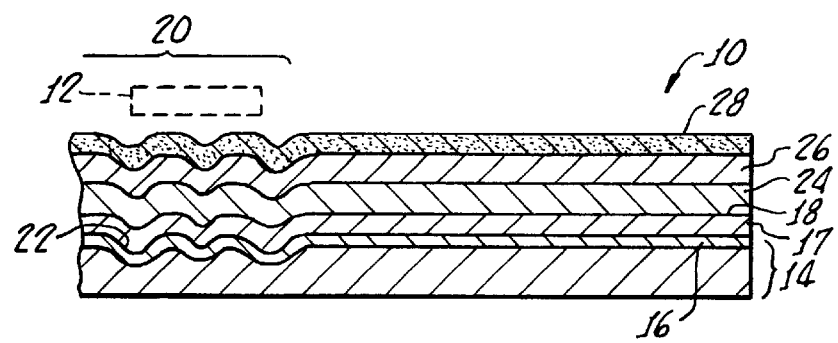
FIG. 2B is a partial half cross section of the disk shown in FIG. 2A illustrating cavities formed therein by a method of this invention.

Turning now to FIGS. 1 and 2A–2B, there is shown a magnetic disk 10 in accordance with this invention for storing data readable by a transducer head 12. Disk 10 includes a rigid substrate 14 formed from aluminum which includes a layer of nickel-phosphorus alloy 16. Substrate 14 has a substantially flat polished surface. Alternatively, substrate 14 can be made from glass or ceramic in which case the layer of nickel-phosphorus 16 would not be included in substrate 14.

Figure 3:
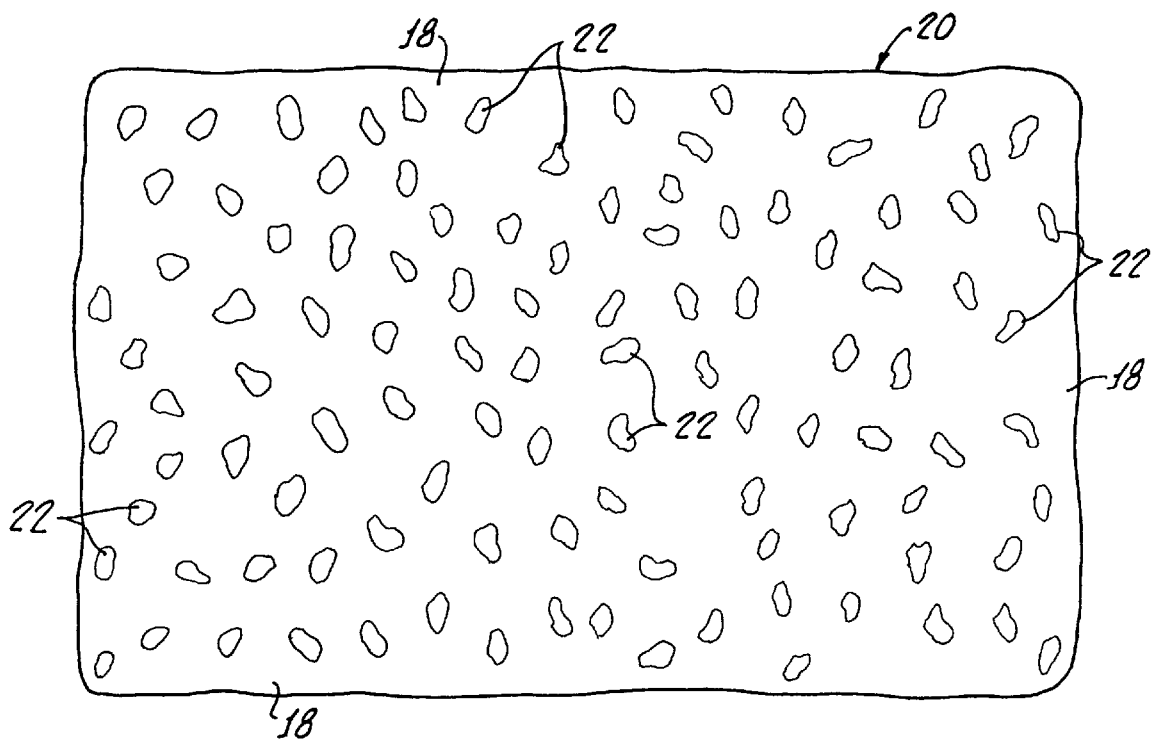
FIG. 3 is a plan view of a textured landing zone produced by a method of this invention showing spaced apart cavities formed in a substrate surface.

A textured landing zone 20, formed in layer 16 in accordance with this invention, provides a means for engaging transducer head 12. The textured landing zone 20 includes a plurality of spaced apart substantially rimless cavities or depressions 22 initially formed in layer 16 and substrate 14. A representation of a portion of the textured landing zone 20 is shown in FIG. 3 which illustrates that the substantially rimless cavities 22 are surrounded by the substantially flat surface 18 of layer 16 on substrate 14. The importance of this spaced apart configuration as well as the substantially rimless cavities themselves will be hereinafter discussed in greater detail when the surface topology of this invention is compared to that of surfaces prepared with prior art techniques.

Following texturing of the landing zone 20, underlayer 17 is deposited over layer 16 including textured landing zone 20. Then, a magnetic layer 24 is deposited, using vacuum deposition, over underlayer 17 including textured landing zone 20. This layer, which may hereinafter sometimes be referred to as the "magnetic recording layer," may also be applied by vacuum deposition; however, it is important that magnetic layer 24 substantially replicates the surface of the underlayer 17 including textured landing zone 20.

It should be appreciated that aluminum substrate 14, layer 16, underlayer 17, as well as magnetic recording layer 24 may be configured in accordance with conventional techniques well known in the art. For example, underlayer 17 can be made from chromium or chromium-vanadium, and magnetic layer 24 can be made from a cobalt alloy such as chromium-cobalt, tantalum-cobalt, and nickel-cobalt. Platinum can also be added to form the cobalt alloy for magnetic layer 24.

A cover layer 26, typically of carbon, is deposited onto magnetic layer 24 in a manner such that the cover layer substantially replicates the surface topography of magnetic layer 24 and textured landing zone. A lubricating layer 28 may be deposited onto the cover layer 26 also in a manner replicating the underlying surface. All of these layers may be applied with techniques well known in the art with thicknesses and densities also recognized in the prior art.

Figure 4:
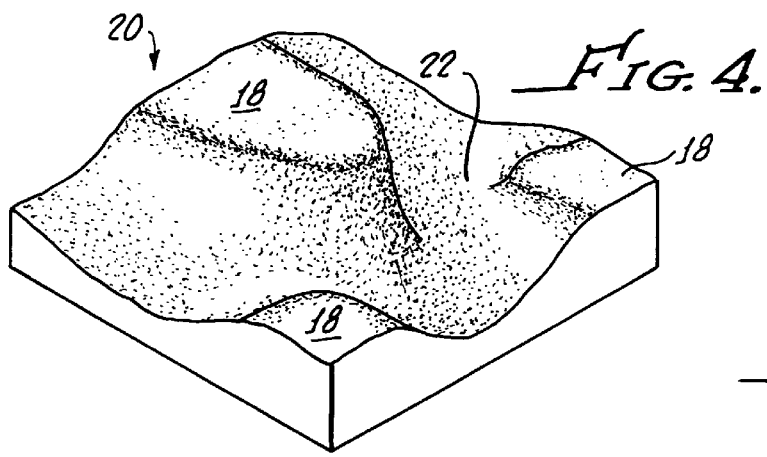
FIG. 4 is a perspective representation of a substantially rimless cavity formed in a surface of a substrate by a method of this invention.
Figure 5:
FIG. 5 is a cross section of the substantially rimless cavity shown in FIG. 4.

It should also be appreciated that the cross section of FIG. 2B does not accurately correspond to the relative thickness of the layers shown therein. Importantly, the cavities 22 formed in layer 16 are substantially rimless, as shown in FIG. 2B, but more clearly represented in FIGS. 4 and 5. Also, FIG. 2B represents a half cross section of magnetic disk 10 shown in FIG. 2A where the half cross section is taken along line 2B of FIG. 2A.

Because the cavities 22 are substantially rimless, surface 18 continuity is preserved. That is, as illustrated in FIG. 2B, during start and stop operations in textured landing zone 20, the transducer head 12 contacts the flat portions 13 of the surface of textured landing zone 20 which has substantially no irregularities therein. The cavities 22, being formed below flat portions 13, significantly reduce the contact area between the surface 13 and the transducer head 12, thus significantly reducing stiction therebetween, but without causing undue wear on the transducer head 12 which may be caused by rims or other irregularities produced by prior art texturing techniques.

Figure 6:
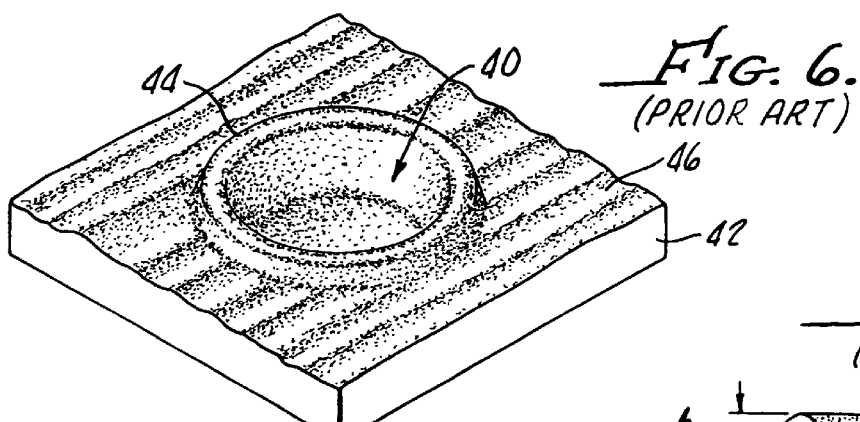
FIG. 6 is a perspective rendering of a rimmed cavity formed in a substrate surface by a laser beam in accordance with the prior art.
Figure 7:
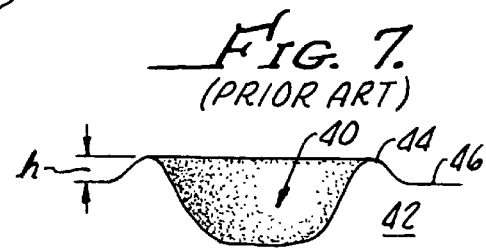
FIG. 7 is a cross sectional view of the rimmed cavity shown in FIG. 6.

For example, turning to FIGS. 6 and 7, there is shown a cavity 40 formed in accordance with laser texturing techniques as taught in U.S. Pat. No. 5,108,781. This patent is to be incorporated herewith in its entirety by this specific reference thereto for the description of prior art laser texturing techniques.

As can be clearly seen in the FIGS. 6 and 7, the cavity 40, in a landing zone, formed by a laser in a substrate 42 is surrounded by a rim 44 which may have a height(h) above a substrate surface 46 of between 0.5 to 1 microinch. This surface topology is substantially replicated through out the formation of the landing zone on a finished magnetic disk for use in storing data readable by a transducer head.

Thus, rim 44 prevents a transducer head, not shown, from flush contact with a surface of the landing zone on the finished magnetic disk due to the protrusion of rim 44 from the surface. Hence, surface continuity is not preserved with laser texturing techniques.

Figure 8:
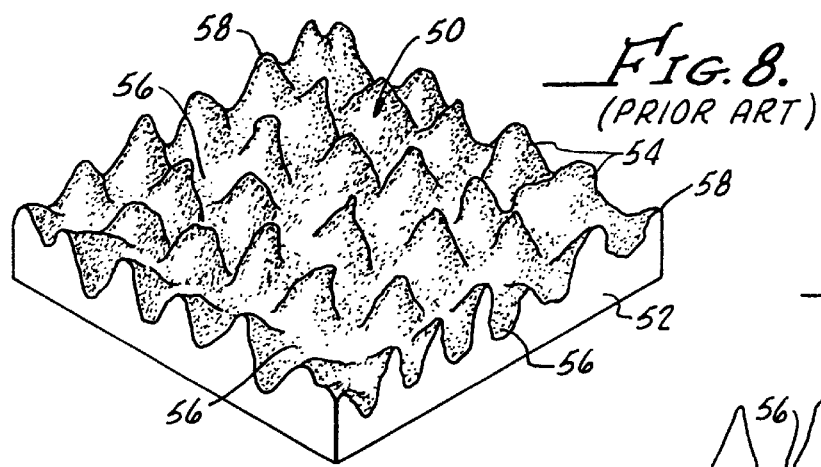
FIG. 8 is a perspective representation of roughness in a textured landing zone and a substrate formed by a prior art mechanical abrasion technique.
Figure 9:
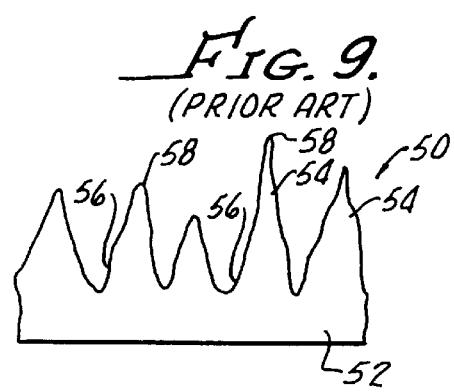
FIG. 9 is a cross section of the surface shown in FIG. 8.

Mechanical abrasive techniques texturing a substrate such as set forth in U.S. Pat. No. 5,508,077 produce a textured surface as represented in FIGS. 8 and 9. The textured surface 50 is produced by directing a particle slurry (not shown) against a substrate 52. Details of this technique are set forth in U.S. Pat. No. 5,508,077, which is also incorporated herewith in its entirety by this specific reference thereto for showing the prior art abrasion techniques.

As shown in FIGS. 8 and 9 substrate 52 has a circular topography which is characteristic of mechanical texturing which includes peaks 54 and valleys 56 which are irregular in height and depth. This surface topology is substantially replicated through out the formation of a landing zone on a finished magnetic disk for use in storing data readable by a transducer head. It should be clear that pointed edges of 58, in the landing zone, are susceptible to plastic deformation when contacted by a transducer head (not shown) and further provide an abrasive surface for a transducer head when landing thereon.

The textured surfaces 50, 46 produced in accordance with the prior art, must be compared with the textured landing zone 20 of this invention in which portions of the surface 18 are left smooth and intact because the cavities 22 formed therein are substantially rimless. As hereinbefore noted, this type of textured landing zone in accordance with this invention reduces stiction and wear between surface 13 and transducer head 12.

Apparatus 100 in accordance with this invention for forming a hydrozone textured landing zone 20 on substrate 14 is diagrammed in FIG. 1. It should be appreciated that while the apparatus 100 illustrates simultaneous texturing of both sides of substrate 14, only one side of substrate 14 may be textured.

As shown in FIG. 1 a spindle 110, or the like, provides means for supporting a substrate 14 for rotation about an axis 112 thereof. It should be appreciated that any suitable apparatus as may be set forth in the hereinabove referenced prior art patents may be used for the support and rotation of substrate 14 thereon.

Means 114 which may include a pump 116, conduit 118 and orifice 120, is provided for forming a stream 122 of discrete pressurized fluid droplets. The term "fluid" includes liquids. It should be appreciated that water is the preferred fluid of choice. However, any other fluid having a viscosity of at most that of water at 20° C. would be suitable for use in the apparatus 100 in accordance with this invention.

A nozzle, or the like, 124, provides a means for directing the stream 122 of discrete pressurized fluid droplets to impact a surface of substrate 14 with sufficient momentum to form cavities 22, as hereinabove described, in a selected annular area 126.

Means, such as for example, rotatable couplings 128, are provided for moving substrate 14 and stream 122 pressurized fluid droplets relative to one another during rotation of substrate 14 in order to create the selected annular area 126 of cavities 22 in the surface of substrate 14 thereby defining the textured landing zone 20 as shown in FIG. 2B. The spindle 110 provides a means for rotating substrate 14 on the axis 112 during movement of the stream 122. Means including an adjustable elbow 130 may be provided for directing the stream 122 of droplets at different angles 132 against substrate 14.

Further, an adjustable sleeve 134 provides a means for varying a distance between the orifice 120 and substrate 14 in order to control the size and depth of cavities therein.

In that regard, the apparatus 100 may use water at a pressure of between about 20,000 PSI (pounds per square inch) and about 100,00 PSI through the orifice 120 having a diameter of between about 0.5 microns (micrometers or um) and about 100 microns. This produces discrete water droplets having a diameter of between about 0.5 microns and about 100 microns. Preferably, a pressure of about 50,000 PSI using an orifice having a diameter of about 60 microns is used wherein the discrete water droplets impact the surface of substrate 14 parallel to axis 112, i.e., angle 132 is 90 degrees. It should be appreciated that all of the variables hereinabove discussed, namely, water pressure droplet size, orifice diameter, fluid viscosity, angle of impact as well as the distance traveled by the discrete droplets, all may be utilized to control the size and shape of the rimless cavities 22 formed in substrate 14.

Using the parameters hereinabove described, the substantially rimless cavities, or depressions, 22, as most clearly shown in FIG. 3, have dimensions with a maximum dimension of between about 5 microns and about 60 microns. In addition, the substantially rimless depressions 22 have a depth of between about 20 microns and about 40 microns and are spaced apart from one another from between about 5 microns and about 60 microns. Preferably, the substantially rimless depressions 22 have an average depth of about 30 microns.

The substantially rimless cavities, or depressions, 22 formed in the substrate 14 cause an initial coefficient of friction between the transducer head and the landing zone of less than about 1.0.

Figure 10:
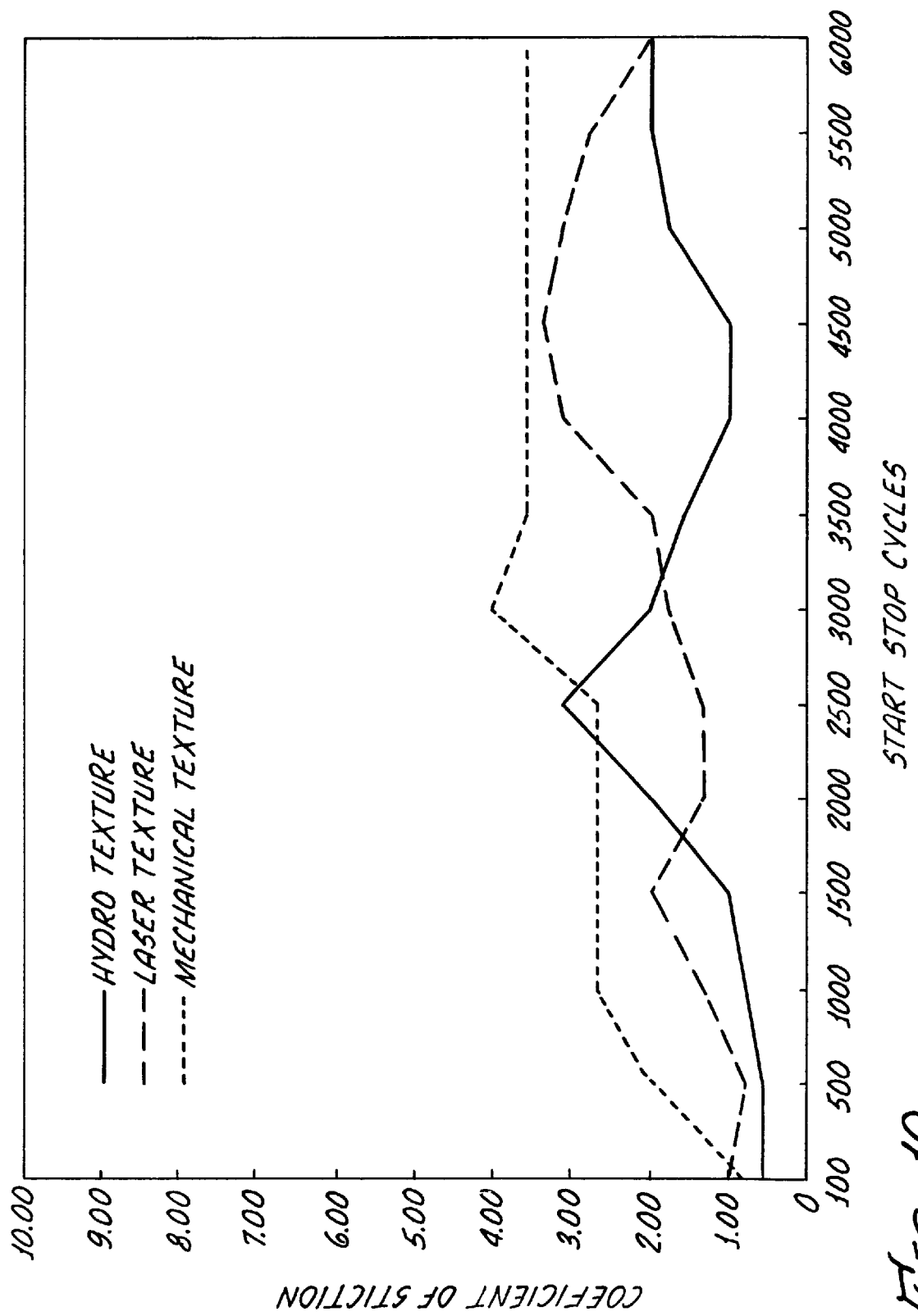
FIG. 10 is a plot of coefficient stiction as a function of start and stop cycles of a transducer head on surfaces textured in accordance with this invention as well as the prior art techniques of laser and mechanical abrasion.

The actual coefficient of stiction as a function of start and stop cycles in the textured landing zone 20 for a finished disk in accordance with this invention is shown in FIG. 10 as line 150. Corresponding measurements taken with identically structured disks but with the textured zone formed by laser techniques, and mechanical techniques, are shown by lines 152 and 154, respectively.

The coefficient of stiction shown in FIG. 10 is determined by lifting a transducer head 12 from a surface and measuring the total force (T) necessary to separate the two, the coefficient being equal to the total force (T) divided by the head weight (H), i.e., T/H. Both T and H are typically measured in grams.

It is clear from comparison of the curves 150–154 shown in FIG. 10, that the texturing provided by the method in accordance with this invention enables much lower stiction that any other texturing technique, with the initial coefficient stiction being less than 1.0.

I claim:

1. A method of texturing a landing zone on a substrate of a magnetic disk for use in a disk drive having a transducer head, the method comprising the step of:

projecting discrete pressurized fluid droplets from an orifice having a diameter of between about 0.5 micron and about 100 microns under a pressure of between about 20,000 PSI and about 100,000 PSI, to impact a substrate surface of the substrate of the magnetic disk with sufficient momentum to form cavities in the landing zone of sufficient width to reduce stiction between the disk and the head, wherein the substrate comprises metal, glass, or ceramic material.

2. The method in accord with claim 1 wherein the step of projecting discrete pressurized fluid droplets comprises directing a stream of discrete pressurized fluid droplets, each having a diameter of between about 0.5 microns and about 100 microns against the substrate surface.

3. The method in accord with claim 2 wherein the step of directing a stream of discrete pressurized fluid droplets comprises forcing the fluid having a viscosity of at most the viscosity of water, at about 20° C., through the orifice.

4. The method in accord with claim 3 wherein the step of directing a stream of discrete pressurized fluid droplets includes varying a distance between the orifice and the substrate surface in order to control a diameter and a depth of the cavities formed in the substrate surface.

5. A method of texturing a landing zone on a substrate of a magnetic disk for use in a disk drive having a transducer head, the method comprising the steps of:

forming a stream of discrete pressurized fluid droplets from an orifice having a diameter of between about 0.5 micron and about 100 microns under a pressure of between about 20,000 PSI and about 100,000 PSI;

directing the stream of discrete pressurized fluid droplets against the substrate of the magnetic disk to create roughness therein; and moving the substrate of the magnetic disk and stream of pressurized fluid droplets relative to one another in order to create an annular area of roughness in the landing zone to reduce stiction between the disk and the transducer head, wherein the substrate comprises metal, glass, or ceramic material.

6. The method in accord with claim 5 wherein the step of forming a stream of discrete pressurized fluid droplets comprises forming the stream of discrete pressurized droplets from a fluid having a viscosity of at most the viscosity of water at 20° C.

7. The method in accord with claim 5 wherein the step of directing the stream of droplets includes directing the droplets at an angle to a substrate surface of the substrate.

8. The method in accord with claim 5 wherein the droplets are formed and directed at the substrate in order to form substantially rimless depressions in a substrate surface of the landing zone.

9. The method in accord with claim 5 wherein each droplet has a diameter of between about 0.5 microns and about 100 microns.

10. The method in accord with claim 8 wherein the step of directing the stream of discrete pressurized fluid droplets includes varying a distance between the orifice and the substrate surface of the landing zone in order to vary a diameter and depth of the substantially rimless depressions formed in the substrate surface.

11. The method in accord with claim 10 wherein the step of forming a stream of discrete pressurized fluid droplets comprises forcing water at about 50,000 PSI through an orifice having a diameter of about 60 microns.

12. The method in accord with clam 10 wherein the step of forming a stream of discrete pressurized fluid droplets comprises forcing water at between about 20,000 PSI and about 100,00 PSI through an orifice having a diameter of between about 0.5 microns and about 100 microns.

* * * * *